United States Patent Office 3,485,662
Patented Dec. 23, 1969

3,485,662
METHOD OF RENDERING TRANSLUCENT SILICONE RUBBER ARTICLES TRANSPARENT
Virgil L. Metevia, Bay City, Mich., assignor to Dow Corning Corporation, Midland, Mich., a corporation of Michigan
No Drawing. Filed Oct. 30, 1967, Ser. No. 679,175
Int. Cl. C08d 13/24
U.S. Cl. 117—138.8  3 Claims

ABSTRACT OF THE DISCLOSURE

Silicone rubber articles which are rendered translucent by surface imperfections are made transparent by coating them with a composition consisting essentially of (1) a vinyldiorganosilyl-endblocked dimethylpolysiloxane, (2) a copolymer of $SiO_2$, trimethylsiloxane and vinyldimethylsiloxane and (3) a compound compatible with (1) and (2) which contains silicon-bonded hydrogen, and thereafter curing the composition.

---

One can formulate silicone rubber compositions which give transparent articles when molded in polished molds or when cast or pressed between two flat surfaces, such as two sheets of glass. However, when clear silicone rubber compositions are molded in standard commercial molds or extruded in standard commercial processes the article so produced is rendered translucent due to surface imperfections. Highly polished molds are very expensive, therefore it is desirable to have a simple economical method of restoring the transparency to clear silicone rubber stocks which have been rendered translucent during fabrication. The present invention provides for such a method.

This invention relates to a method of restoring transparency to an article made of cured silicone elastomer which is rendered translucent by surface imperfections which comprises coating said silicone rubber with an effective amount of a coating composition consisting essentially of (1) A polysiloxane of the formula

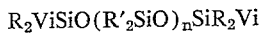

in which R and R' are both phenyl or methyl radicals and Vi is the vinyl radical, at least 80 mol percent of the R' groups being methyl, in which siloxane (1) $n$ has a value such that the viscosity of (1) is at least 500 cs. at 25° C., (2) From 5 to 50% by weight based on the weight of (1) and (2) of a copolymer of $SiO_2$, $Me_3SiO_{.5}$ and $Me_2ViSiO_{.5}$ siloxane units in which copolymer there is from 1.5 to 3.5% by weight vinyl groups based on the weight of (2) and in which copolymer (2) the ratio of total $Me_3SiO_{.5}$ and $Me_2ViSiO_{.5}$ to $SiO_2$ units is from .6:1 to 1:1, (3) A compound compatible with (1) and (2) which is a siloxane containing from 0.1 to 1.7% by weight silicon-bonded hydrogen atoms, the remaining valences of the silicon atoms in (3) being satisfied by phenyl or methyl radicals, there being at least 2 silicon-bonded hydrogen atoms per molecule, and in (3) any hydrocarbon radicals attached to SiH silicon being essentially all methyl radicals, the amount of (3) being such that there is from .75 mol of SiH per mole of vinyl radicals in (1) and (2) to 2.5 mols of SiH per mole of vinyl radicals in (1) and (2), and (4) A curing catalyst for the coating composition, and thereafter curing the coating composition on the surface of the silicone rubber article whereby a transparent article is obtained.

The base article of this invention can be prepared from any transparent silicone rubber compositions which are well-known in the art. As is well-known, transparency is obtained when the refractive index of the polymer and the filler is almost identical. This can be done by either adjusting the polymer composition to match the refractive index of the filler or by treating the silica to alter its refractive index.

For example, dimethylpolysiloxane containing copolymerized phenylmethylsiloxane have refractive indices essentially the same as $SiO_2$. Other siloxane groups such as trifluoropropyl can be included in the polymer provided the composition is so adjusted that the refractive index of the base polymer and the filler is practically identical.

On the other hand, one can use modified fillers such as those disclosed in U.S. Patent 3,035,985.

In addition, the base rubber can contain any of the other common ingredients employed in silicone rubber provided that they do not render the composition inherently opaque or translucent.

The base silicone rubber can be cured by any of the mechanisms known for curing silicone rubber and can be molded or fabricated by any of the conventional techniques. In so doing, of course, the surface of the article is made irregular and thus the clear rubber is rendered translucent.

The coating composition employed in this invention is a known material and is described and claimed in U.S. Patent 3,284,406, the entire disclosure of which is hereby incorporated in this application by reference. This being so there is no need to burden this application with a detail description of said coating compositions. Sufficient to say that they are, in general, a combination of (1) a linear or branched fluid polysiloxane having vinylsiloxy groups on the end of the chain, (2) a copolymer of $SiO_2$, trimethylsiloxane and vinyldimethylsiloxane, and (3) a SiH containing siloxane which is compatible with (1) and (2). This composition is cured by the addition of the SiH groups in (3) to the vinyl groups of (1) and (2) producing a crosslinked material.

This viscosity of the base polymer (1) should be at least 500 cs. at 25° C. The upper limit of the viscosity is not critical but it is preferred that the viscosity range be from 500 to 500,000 cs.

For the purpose of this invention any catalyst which induces the addition of SiH to vinyl can be employed. Inasmuch as the composition is to be used as a coating which will usually be exposed to air during cure, it is preferred that the catalyst used be one which does not suffer from air inhibition. The most efficient catalyst known at this time is a platinum catalyst which can be any of the platinum catalysts commonly used to promote the addition of SiH to carbon-carbon unsaturation. For example, the catalyst can be finely divided platinum, chloroplatinic acid, platinum chloride or any of the complexes of platinum with organic compounds such as olefins.

The coating composition can be applied to the base rubber by any convenient method such as by dipping, spraying, or brushing. Since it is essential that the coating be even and that it fill the imperfections in the surface of the base rubber it is desirable that the composition be diluted with a solvent and preferably be sprayed on the surface of the base member. It is to be understood, however, that this procedure is not critical.

The best procedure presently known is to dilute the coating composition in a volatile solvent such as fluorochloromethanes to a concentration of from .5 to 5% by weight and then spray this composition on the surface of the base member. If desired, other solvents can be used such as benzene, petroleum ether, diethylether, or any other solvent in which the coating composition is soluble and which does not deleterously effect the base silicone rubber.

After the coating composition is applied to the base rubber it can be cured in any desired manner. Some compositions will cure at room temperature or it may be desirable to heat the silicone rubber to cure the coating. In any event the general procedure is to allow the coating to air dry and then to cure either at room temperature or by heating at say 150° C. or say 30 minutes. At this point the entire article is transparent.

The amount of coating applied will vary with the surface nature of the article. The rougher the surface the more coating is needed per unit area. Thus, no meaningful numerical limitations can be placed on the weight pickup of the base member. It is only necessary that sufficient amount of coating be applied to render the finished article transparent.

The transparent articles of this invention can be used for any use in which transparency is desired. For example, they can be used as face masks, eye pieces for masks or for gaskets for automobiles in which it is desirable that the gasket or sealing material be transparent. They can also be used for decorative purposes in any areas in which transparency is desired either for sealing or gasketing material.

The term "consisting essentially of" as used herein means that the coating composition can contain other ingredients such as additional vinyl-containing siloxanes, ultra-violet absorbers or other ingredients which do not alter the essential characteristics of the coating composition.

In the specification and claims the following abbreviations are used: Me for methyl, Ph for phenyl and Vi for vinyl.

The following examples are illustrative only and should not be construed as limiting the invention which is properly delineated in the appended claims.

EXAMPLE 1

The base silicone rubber employed in this invention was made from a mixture of 100 parts of a copolymer of 7.5 mol percent phenylmethylsiloxane, 92.5 mol percent dimethylsiloxane, which copolymer was endblocked with dimethylvinylsiloxane units, 40 parts of a fume silica and .7 part of the vulcanizing agent 2,5-dimethyl, 2,5-bis-tertiarybutylperoxyhexane. This stock was molded in a conventional mold and then vulcanized in the standard manner for silicone rubber. The resulting article was translucent.

The coating composition employed was a mixture of (1) 104 parts of a 2000 cps. viscosity, vinylphenylmethylsiloxy-endblocked dimethylpolysiloxane containing 0.2% by weight vinyl, (2) 56 parts of a copolymer of $SiO_2$, trimethylsiloxane and dimethylvinylsiloxane, in such proportion that the copolymer contained about 2 weight percent vinyl groups and had a total methyl and vinyl to silicon ratio of .915:1, (3) 9 parts of a copolymer of dimethylhydrogensiloxane, dimethylsiloxane, methylhydrogensiloxane and trimethylsiloxane, in such proportion that the mol ratio of the various units was 1.9, 4.9, 3.1 and .1 respectively, .02 part of methylvinylpolysiloxane cyclics and (4) 20 parts per million platinum added as chloroplatinic acid.

The coating composition was dissolved in a mixture of 60% trichloromonofluoromethane and 40% dichlorodifluoromethane in amount to give a 2% by weight solution of the coating composition. The solution was then sprayed on the surface of the cured silicone rubber, air dried and cured one hour at 150° C. The translucent base rubber was rendered transparent by the coating.

EXAMPLE 2

The silicone rubber based article was prepared from the same formulation as employed in Example 1. The rubber was molded in a conventional mold in the form of a face mask and was thereby rendered translucent.

The coating composition employed in this invention was a mixture of (1) 104 parts by weight of a 15,400 cs. dimethylvinylsiloxy-endblocked dimethylpolysiloxane, (2) 52 parts by weight of a copolymer of $SiO_2$, trimethylsiloxane and dimethylvinylsiloxane containing about 2% by weight vinyl groups and having a total methyl and vinyl to silicon ratio of .915:1, (3) 9 parts by weight of a copolymer of 1 mol percent trimethylsiloxane, 19 mol percent dimethylhydrogensiloxane, 31 mol percent methylhydrogensiloxane and 49 mol percent dimethylsiloxane and 2 parts by weight of methylvinylpolysiloxane cyclics.

The mixture was catalyzed with 10 parts per million platinum added as chloroplatinic acid.

A 2% by weight solution of the coating composition was made in a solvent mixture of 60% by weight trichloromonofluoromethane and 40% by weight dichlorodifluoromethane. The solution was sprayed onto the face mask and the coating allowed to air dry and then the coating was cured 30 minutes at 150° C. The face mask was rendered transparent.

EXAMPLE 3

Equivalent results obtained when the following materials are employed for ingredient (3) in the coating composition of Example 1,

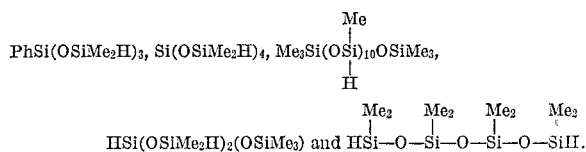

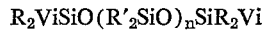

That which is claimed is:

1. A method of restoring transparency to an article of cured silicone elastomer which is rendered translucent by surface imperfections, which comprises coating a cured silicone rubber with an effective amount of a coating composition consisting essentially of (1) a polysiloxane of the formula $$R_2ViSiO(R'_2SiO)_nSiR_2Vi$$

in which R and R' are both phenyl or methyl radicals and Vi is the vinyl radical, at least 80 mol percent of the R' groups being methyl, in which siloxane (1) $n$ has a value such that the viscosity of (1) is at least 500 cs. at 25° C., (2) from 5 to 50% by weight based on the total weight of (1) and (2) of a copolymer of $SiO_2$, $Me_3SiO_{.5}$ and $Me_2ViSiO_{.5}$ siloxane units in which Me is methyl, in which copolymer there is from 1.5 to 3.5 inclusive percent by weight vinyl groups based on the weight of (2) and in copolymer (2) the ratio of total $Me_3SiO_{.5}$ and $Me_2ViSiO_{.5}$ to $SiO_2$ units is from 0.6:1 to 1:1, (3) a compound compatible with (1) and (2) which is a siloxane containing from .1 to 1.7% by weight silicon-bonded hydrogen atoms, the remaining valences of the silicon atoms in (3) being satisfied by radicals selected from the group consisting of phenyl and methyl radicals, there being at least 2 silicon-bonded hydrogen atoms per molecule, and in (3) any hydrocarbon radicals attached to SiH silicone being essentially all methyl radicals, the amount of (3) being such that there is from .75 mol of SiH per mole of vinyl radicals in (1) and (2) to 2.5 mols of SiH per mole of vinyl radicals in (1) and (2) and (4) a curing catalyst for the coating composition and thereafter curing the coating composition on the silicone rubber base member, whereby a transparent article is obtained.

2. The method in accordance with claim 1 in which the catalyst is a platinum catalyst.

3. The method of claim 2 in which (1) has a viscosity of 500 to 500,000 cs. at 25° C.

References Cited

UNITED STATES PATENTS 3,262,381  7/1966  Zimmerman _____ 117—2 X

WILLIAM D. MARTIN, Primary Examiner

J. E. MILLER, Jr., Assistant Examiner

U.S. Cl. X.R.

117—2, 161